(12) United States Patent
Deolasee et al.

(10) Patent No.: US 7,478,275 B1
(45) Date of Patent: Jan. 13, 2009

(54) METHOD AND APPARATUS FOR PERFORMING BACKUP STORAGE OF CHECKPOINT DATA WITHIN A SERVER CLUSTER

(75) Inventors: Pavan Deolasee, Pune (IN); Veeral Shah, Mumbai (IN)

(73) Assignee: Symantec Operating Corporation, Cupertino, CA (US)

( * ) Notice: Subject to any disclaimer, the term of this patent is extended or adjusted under 35 U.S.C. 154(b) by 654 days.

(21) Appl. No.: 10/812,139

(22) Filed: Mar. 29, 2004

(51) Int. Cl.
*G06F 11/00* (2006.01)
(52) U.S. Cl. ...................................................... 714/13
(58) Field of Classification Search .................. 714/4, 714/5, 6, 7
See application file for complete search history.

(56) References Cited

U.S. PATENT DOCUMENTS

| | | | |
|---|---|---|---|
| 5,363,503 A * | 11/1994 | Gleeson | 714/10 |
| 5,630,047 A | 5/1997 | Wang | |
| 5,734,814 A * | 3/1998 | Corbin et al. | 714/6 |
| 6,513,050 B1 * | 1/2003 | Williams et al. | 707/202 |
| 6,708,288 B1 * | 3/2004 | Ziegler et al. | 714/15 |
| 7,069,401 B1 * | 6/2006 | Noonan et al. | 711/162 |
| 2003/0078933 A1 * | 4/2003 | Gara et al. | 707/100 |

OTHER PUBLICATIONS

Wang, et al., Integrating Checkpointing with Transaction Processing, In The 27th International Symposium on Fault-Tolerant Computing, Seattle, Jun. 1997., p. 304-308.

* cited by examiner

*Primary Examiner*—Nadeem Iqbal
(74) *Attorney, Agent, or Firm*—Moser IP Law Group

(57) ABSTRACT

A method and apparatus for storing, in a fault tolerant manner, checkpoint data in backup servers. To facilitate fault tolerance, the checkpoint data produced by a production server is distributed to a plurality of backup servers. In one embodiment, the method subsegments each segment of checkpoint data, produces parity data for parity groups of the subsegmented checkpoint data, and stripes the subsegments and the parity data across a number of backup servers within a server cluster.

19 Claims, 4 Drawing Sheets

METHOD AND APPARATUS FOR PERFORMING BACKUP STORAGE OF CHECKPOINT DATA WITHIN A SERVER CLUSTER

BACKGROUND OF THE INVENTION

1. Field of the Invention

Embodiments of the present invention generally relate to data storage systems, and more particularly, to a method and apparatus for performing backup storage of checkpoint data.

2. Description of the Related Art

Modern computer networks generally comprise a plurality of user computers connected to one another and to a computer server via a communications network. To provide redundancy and high availability of information and applications that are executed upon a computer server, multiple computer servers may be arranged in a cluster, i.e., forming a server cluster. Such server clusters are available under the trademark VERI-TAS CLUSTER SERVER from Veritas Software Corporation of Mountain View, Calif. In a server clusters, the plurality of servers communicate with one another to facilitate failover redundancy such that when software or hardware (i.e., computer resources) become inoperative on one server, another server can quickly execute the same software that was running on the inoperative server substantially without interruption. As such, a user of services that are supported by a server cluster would not be substantially impacted by an inoperative server or software.

To facilitate the substantially seamless transition of user service to another server within the server cluster, the production server, i.e., the server that is presently supporting users of the server services, stores checkpoint data in random access memory (RAM). This checkpoint data is essentially the data being used by software at particular times as well as the server state at those particular times. The backup software within the production server takes a "snapshot" of the data and the server state, then stores that information as checkpoint data. To create redundancy, the checkpoint data is remotely stored on a backup server, i.e., another server in the server cluster. Upon failure of the software or production server, the software is booted on the backup server and the checkpoint data can be used to start the software at approximately the position within the software where the failure occurred.

Upon failover, the backup server becomes the production server from the view of the user without substantial interruption of the software utilization. Thus, upon failover to the backup server, the software is executed from the last saved state which can then use the stored data related to that saved state.

The storage of the checkpoint data on a single backup server or a node within the server cluster can be problematic if the production server and the backup server fail simultaneously.

Therefore, there is a need in the art for a method and apparatus for improving the fault tolerance of the storage of checkpoint data within a server cluster.

SUMMARY OF THE INVENTION

The embodiments of the present invention are generally directed to a method and apparatus for storing checkpoint data in a fault tolerant manner. To facilitate redundancy, the invention distributes the checkpoint data across a plurality of backup servers. In one embodiment, the method distributes the checkpoint data by striping the data across a plurality of backup servers for storage in memory such as random access memory (RAM), disk drive storage, and the like. Specifically, the invention subsegments each segment of checkpoint data produced by a production server, produces parity data for parity groups of the subsegmented checkpoint data, and stripes the subsegments and the parity data across a number of backup servers within a server cluster for storage therein. In other embodiments of the invention, the checkpoint data may be distributed in other ways, e.g., mirroring, striping without parity, and the like. The checkpoint data distribution may be performed by the production server, a backup server, or a computer specifically tasked to perform checkpoint data distribution. Upon failure of the production server, one of the backup servers reassembles the segments of checkpoint data using the subsegments and/or the parity data. One of the backup servers will then execute software using the reassembled checkpoint data.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF THE INVENTION

Figure 1:
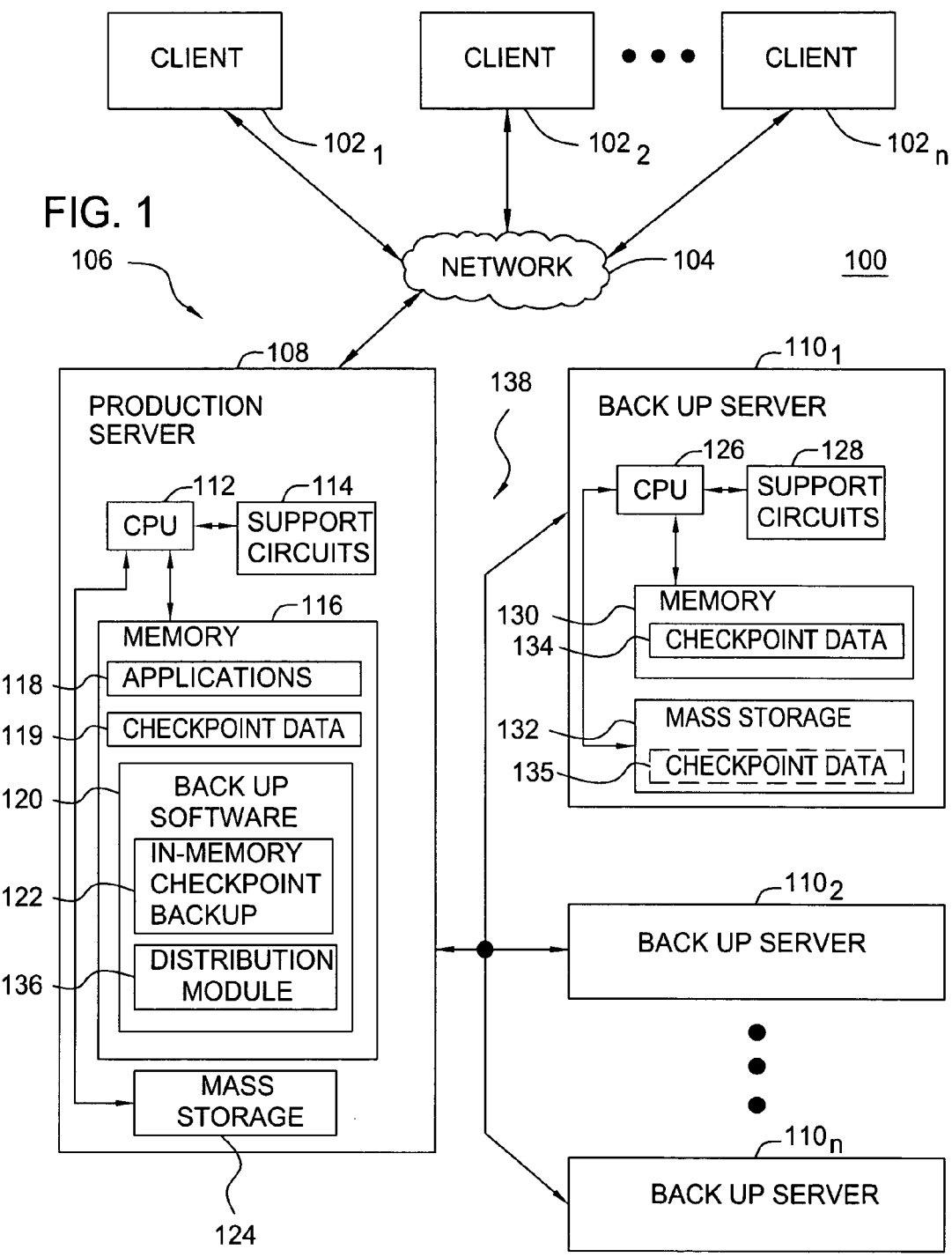
FIG. 1 is a block diagram of a computer network having a server cluster that operates in accordance with the present invention.

FIG. 1 depicts a computer network 100 in which one embodiment of the present invention may be utilized. The invention, as shall be discussed below, is a method and apparatus for storing checkpoint data that is created in a production server 108 upon a plurality of backup servers $110_1$, $110_2$, $110_3$ ... $110_n$. As such, the checkpoint data is stored in a redundant, fault-tolerant manner.

The computer network 100 comprises a plurality of client computers $102_1$, $102_2$ ... $102_n$ that are connected to a network 104. The client computers 102 may contain one or more individual computers, wireless devices, personal digital assistants, desktop computers, laptop computers or any other digital device that may benefit from connection to a computer network.

The computer network 104 is a conventional computer network which may be an Ethernet network, a fiber channel network and the like. The client computers 102 may be connected to a server cluster 106 through a firewall, a router, or some form of switch (not shown). The server cluster 106 generally comprises multiple servers 108, $110_1$, $110_2$, ... $110_n$ that are interconnected to one another by a server cluster network 138. Although the servers within the server cluster 106 may be identical, one of the servers will be operating to service particular clients (users) at any particular time. This server is identified as the production server 108 while all other servers $110_1$, $110_2$, ... $110_n$ are deemed backup servers vis-à-vis the production server 108. All the servers 108, $110_1$, $110_2$ ... $110_n$ may be referred to as nodes of the server cluster 106. Although one server cluster 106 is depicted in FIG. 1, those skilled in the art will realize that many server cluster benefiting from the invention can be connected to the computer network 104. Such a server cluster 106 may be a VERITAS CLUSTER SERVER available from Veritas Software Corporation of Mountain View, Calif.

The production server 108 generally includes at least one central processing unit (CPU) 112, support circuits 114 and memory 116. Additionally, the production server 108 may contain mass storage 124 or the server 108 may be connected to a common mass storage system (not shown) that is shared by a plurality of servers. The CPU 112 may include one or more commercially available processors. The support circuits 114 are well known circuits that include cache, power supplies, clocks, input/output interface circuitry, and the like.

The memory 116 may include random access memory, read only memory, removable disk memory, flash memory, and various combinations of these types of memory. The memory 116 is sometimes referred to as main memory and may in part be used as cache memory. The memory 116 stores checkpoint data 119 and may store various software applications such as application software 118 and backup software 120. In one embodiment of the invention, the backup software 120 further comprises a checkpoint data backup module 122 and a distribution module 136. In other embodiments of the invention, modules 122 and 136 may be stored and executed by a backup server 100 or a specialized computer (not shown) that is solely used to coordinate backup of the checkpoint data 119.

The backup software 120 is used to insure that the checkpoint data 119 as well as other data that is stored in the production server 108 is sent to the backup servers $110_1$, $110_2$ ... $110_n$ for remote storage from the production server 108. Such backup software 120 insures that the production server 108 is fault tolerant such that a failure of the production server 108 will quickly be compensated by one or more of the backup servers $110_1$, $110_2$ ... $110_n$. The checkpoint data backup module 122 stores checkpoint data 119 at various points during execution of the application software. As one or more applications 118 are being executed by the production server 108, the checkpoint data backup module 122 will intermittently save the state information of the application as well as data that is used by the application at that point in time. In this manner, the state and data are related at the particular point in time that the checkpoint data is stored. The invention, as will be described in more detail below, uses a distribution module 136 to subsegment the checkpoint data 119 as well as form parity information from a plurality of checkpoint data subsegments. The distribution module 136 then sends the subsegments and parity information to various backup servers $110_1$, $110_2$ ... $110_n$ for storage in a diversified manner. In one embodiment, the diversified manner involves striping subsets of the checkpoint data and the parity information on memory devices within each of the backup servers $110_1$, $110_2$ ... $110_n$. The checkpoint data may be stored in the backup servers in RAM, disk drive storage, and the like.

Each backup server $110_1$, $110_2$ ... $110_n$ comprises a CPU 126, support circuits 128, memory 130 and mass storage device 132. As discussed previously, the mass storage device 132 may be a mass storage system that supports a plurality of the backup servers 110. The checkpoint data 134 is stored in, for example, the memory 130 for recall and use when the production server 108, corresponding to that checkpoint data, fails. Upon failover, the backup servers $110_1$, $110_2$ ... $110_n$ cooperate to execute the applications that were running on the production server from the server state indicated by the checkpoint data. By storing the checkpoint data 134 in the memory 130, the checkpoint data 134 may be recalled and used quickly by the backup server 110. Alternatively, the checkpoint data 134 can be stored upon the mass storage device 132, e.g., a disk drive or disk drive array, as indicated by the dashed box.

To facilitate communications within the server cluster, the backup servers and the production server are interconnected by, for example, a private network 138. The private network 138 facilitates redundant use of the servers by providing communications between each of the servers within the server cluster 106. As such, the failover process is coordinated amongst the servers in the cluster via the network 138.

Figure 2:
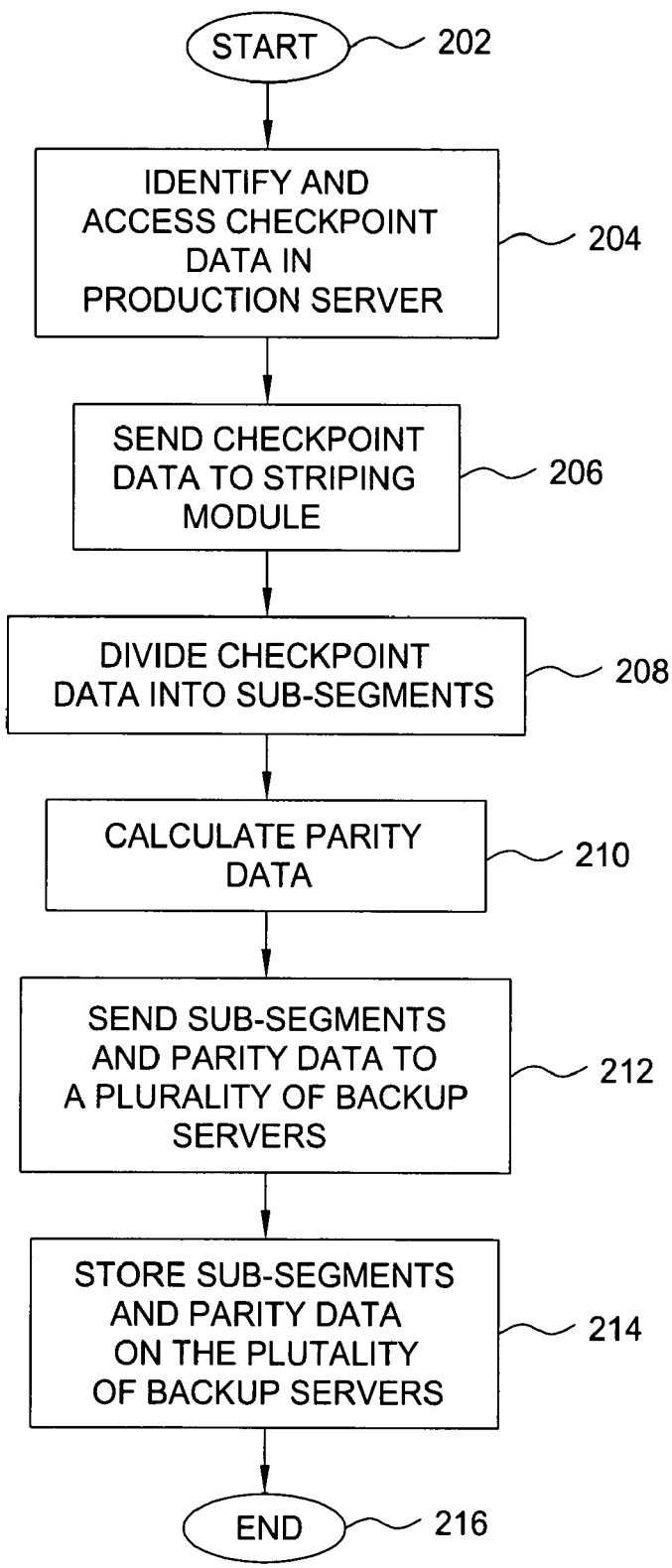
FIG. 2 depicts a flow diagram of a method of operating a server cluster in accordance with the present invention.

FIG. 2 depicts a flow diagram of a method 200 of operation for the checkpoint data backup module 122. The function of the distribution module 136 is embedded within the method 200.

The method 200 starts at step 202 and proceeds to step 204, wherein the method 200 identifies and accesses the checkpoint data in the production server. Generally, the checkpoint data is stored in random access memory within the production server. The method 200 will typically request the checkpoint data after each update of the data by its associated application. At step 206, the checkpoint data is sent to the distribution module. The distribution module may distribute the checkpoint data in one of a number of ways. For example, the data could be: (1) replicated for storage on a plurality of backup servers (e.g., a mirroring technique), (2) striped across the backup servers, (3) striped with parity data across the backup servers, and the like.

In one specific embodiment, at step 208, within the distribution module, the method 200 divides the checkpoint data into subsegments. As such, a segment of checkpoint data containing the production server state, as well as any data that is involved in the execution of the application at that state, is divided into subsegments. At step 210, the distribution module selects groups of subsegments (e.g., three subsegments to a redundancy group) and calculates the parity data related to the redundancy groups. For example, if a segment of checkpoint data is divided into 9 segments labeled 0-8, then parity data will be generated for every three subsegments (see FIG. 3 below). At step 212, the subsegments and the parity data are sent to a plurality of backup servers in a striped manner. By striped manner, it is meant that the data is distributed over and stored in a plurality of memory devices coupled to or embedded within the backup servers. Such distribution of the data in this manner provides redundancy and fault tolerance for the stored information. One specific embodiment that is used for striping data is described with reference to FIG. 3 below. At step 214, the subsegments are stored along with the parity data on the plurality of backup servers. The method 200 ends at step 216. The method 200 is executed after each checkpoint such that when the checkpoint data and the state of the executing application are known (i.e., updated), the method 200 executes and stores the checkpoint data and parity information on the various backup servers within the server cluster.

Figure 3:
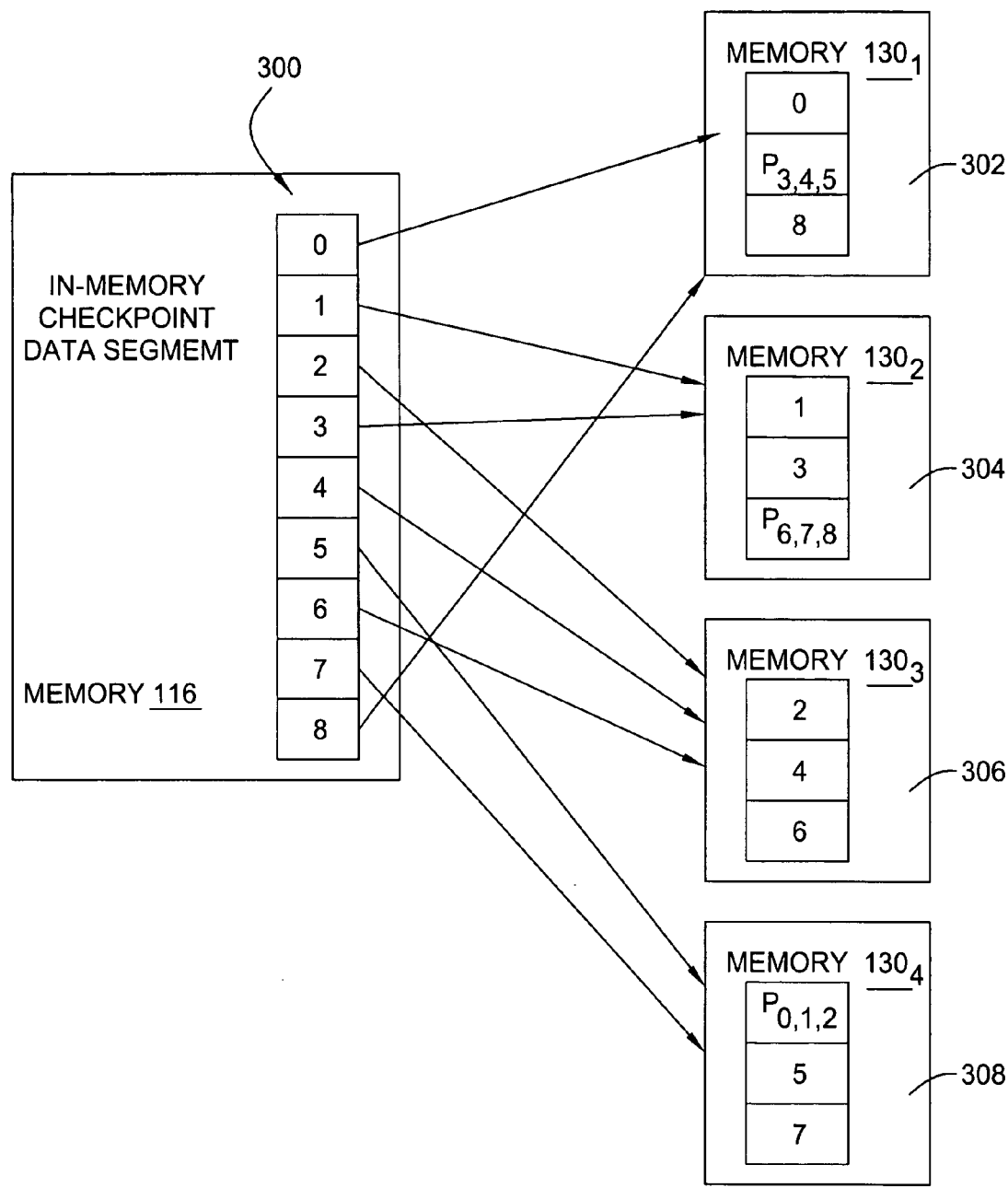
FIG. 3 graphically depicts a diagram of data segmentation and storage within a server cluster in accordance with one embodiment of the present invention.

FIG. 3 graphically depicts one embodiment of an illustrative striping algorithm that is used to distribute checkpoint data across the backup servers. Each segment 300 of checkpoint data is divided into N subsegments, where N is an integer that is greater than 0. In the depicted embodiment, N is 9 and the subsegments 0-8. To stripe the data across four backup servers, the subsegments are separately stored in memory as groups 302, 304, 306 and 308. Subsegment 0 and subsegment 8 are stored in memory $130_1$ of the first backup server. Additionally, parity data for subsegments 3, 4 and 5, i.e., the exclusive OR of the data in subsegments 3, 4 and 5, is also stored in memory 130, as group 302. Group 304, comprising subsegment 1 and subsegment 3 and the parity data of subsegments 6, 7 and 8, is stored in memory $130_2$. Memory $130_3$ coupled to a third backup server stores the subsegment group 306 comprising subsegments 2, 4 and 6. Lastly, memory $130_4$ coupled to the fourth backup server stores group 308 comprising parity data for subsegments 0, 1 and 2 and subsegment 5 and subsegment 7.

In this manner, the parity data and the subsegments are striped across four memory devices within four separate backup servers. Each segment of checkpoint data is processed in this manner until all of the data is distributed across a number of backup servers.

Upon failure of the production server and up to one of the backup servers, the application may be restarted using the checkpoint data at the point at which the failure occurred. If both the production server and one of the backup servers fail, the parity data is used to reconstruct each checkpoint data segment. The striping of the data which is similar to that used in RAID 5 in a redundant fault tolerant disk drive array may also be striped and/or stored in other redundant manners either with or without parity data. For example, the checkpoint point data could be mirrored onto a plurality of storage devices coupled to separate backup servers (similar to RAID 1 or 2), or the data may be striped without parity data (similar to RAID 3), and the like.

Figure 4:
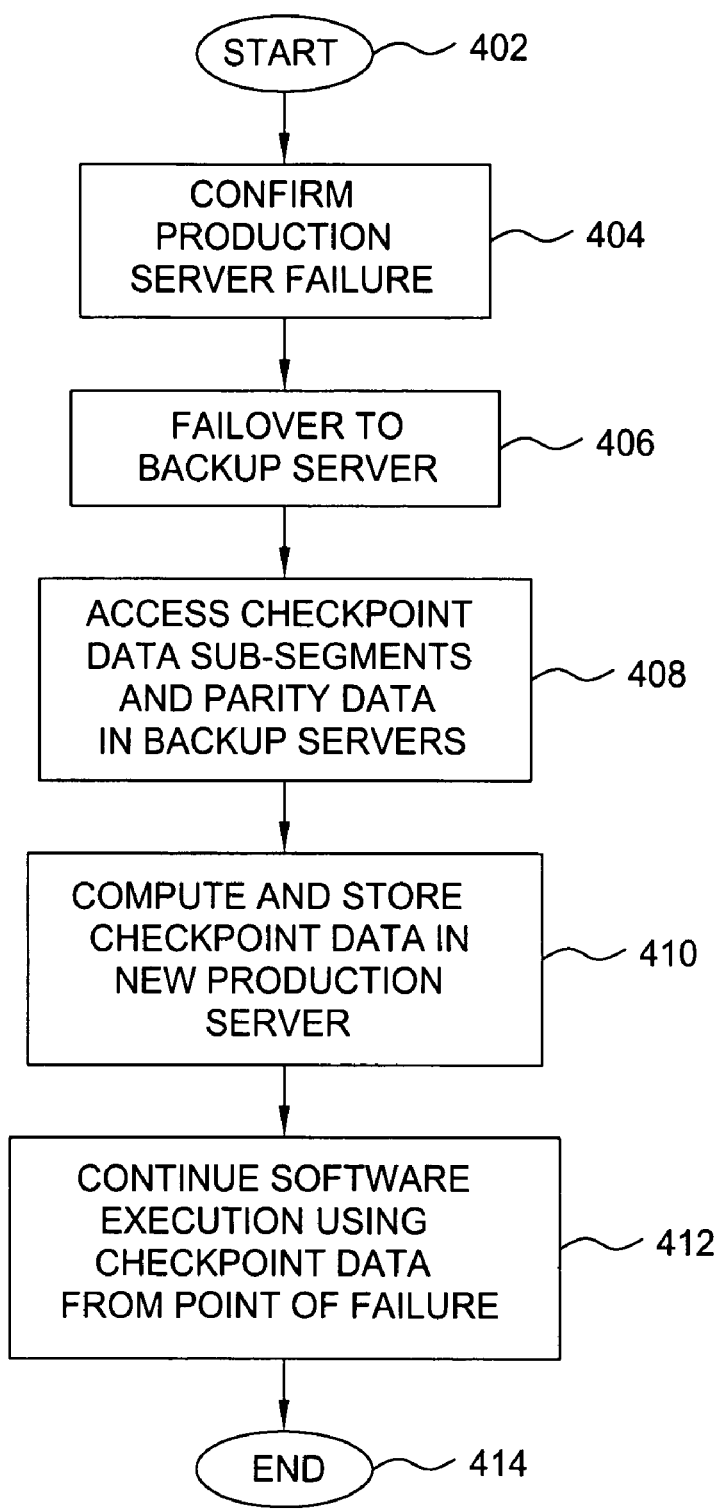
FIG. 4 depicts a flow diagram of a method for utilizing checkpoint data that is stored in accordance with the present invention.

FIG. 4 depicts a method 400 that summarizes operation of the server cluster upon failure of the production server 108. The method 400 starts at step 402 (e.g., upon failure of the production server) and proceeds to step 404 wherein the method confirms that the production server has failed. The conventional failover process is initiated to cause failover to a backup server. As such, one of the backup servers will begin to execute the software that was running on the production server. To facilitate use of the software, the backup server will require the checkpoint data from the last checkpoint before the production server failure. At step 408, the method 400 accesses the checkpoint data subsegments and parity data that are stored in the backup servers. As such, the backup server that is now operating as the new production server, requests the checkpoint data (including parity) from the backup servers. At step 410, the method 400 computes and stores the checkpoint data into the new production server, (i.e., the data segments are reformed). At step 412, the new production server continues software execution (i.e, supporting users) using the checkpoint data from the point of failure onwards. The method ends at step 414.

Although the foregoing discussion assumes that the production server contains backup software that use a diversification module for subsegmenting the checkpoint data, that module may be located in one or more of the backup servers such that the production server will send the diversification checkpoint data to the backup server that is, at that moment, executing a diversification module for storing the checkpoint data in a striped manner. In other embodiments, there may be a separate server or computer for handling the diversification of the checkpoint data across the backup servers.

While the foregoing is directed to embodiments of the present invention, other and further embodiments of the invention may be devised without departing from the basic scope thereof, and the scope thereof is determined by the claims that follow.

What is claimed is:

1. A method for providing fault tolerant checkpoint data within a server cluster comprising a production server and a plurality of backup servers, the method comprising:
    accessing checkpoint data within the production server;
    distributing the checkpoint data;
    storing the distributed checkpoint data on the plurality of backup servers accessing the distributed checkpoint data;
    reassembling the checkpoint data using the distributed checkpoint data; and
    using the checkpoint data to initiate execution of software.

2. The method of claim 1, wherein the distributing step comprises:
    creating a redundancy group of checkpoint data; and
    storing the redundancy group of checkpoint data upon the plurality of backup servers.

3. The method of claim 2, wherein creating the redundancy group comprises:
    subsegmenting the checkpoint data; and
    forming groups of subsegments.

4. The method of claim 3, wherein the storing step comprises:
    striping the subsegments across a plurality of backup servers.

5. The method of claim 2, further comprising:
    creating parity data for each group.

6. The method of claim 5, wherein the storing step comprises:
    striping the subsegments and parity data across a plurality of backup servers.

7. The method of claim 1, wherein the storing step comprises:
    mirroring the checkpoint data onto the plurality of backup servers.

8. A system for providing fault tolerant checkpoint data comprising:
    a production server for generating checkpoint data;
    means for forming distributed checkpoint data comprising subsegments of the checkpoint data;
    a plurality of backup servers for storing the distributed checkpoint data, where each of the backup servers in said plurality of backup servers:(i) stores at least one subsegment of the subsegments of the checkpoint data, (ii) accesses the distributed checkpoint data, (iii) reassembles the checkpoint data using the distributed checkpoint data, and (iv) uses the checkpoint data to initiate execution of software.

9. The system of claim 8, wherein the means for forming the distributed checkpoint data is located within the production server.

10. The system of claim 8, wherein the means for forming the distributed checkpoint data is located within a backup server within the plurality of backup servers.

11. The system of claim 8, wherein the means for forming the distributed checkpoint data is located within a computer that is separate from the production server or the plurality of backup servers.

12. The system of claim 8, wherein the means for forming the distributed checkpoint data further comprises:
    means for striping the at least one subsegment onto the plurality of backup servers.

13. An apparatus for generating fault tolerant checkpoint data, the apparatus comprising:
    a first server that accesses checkpoint data, segments the checkpoint data, and supplies the segments of checkpoint data to a plurality of second servers, wherein the first server produces parity data for the segments of checkpoint data and supplies the parity data to the plurality of second servers.

14. The apparatus of claim 13 wherein the segments of check point data are supplied to the plurality of second servers in a striped manner.

15. A method of generating fault tolerant checkpoint data, the method comprising:
    accessing checkpoint data that is produced by a first server;
    the forming distributed checkpoint data having at least one segment of checkpoint data; and
    supplying the distributed checkpoint data to a plurality of second servers
    accessing the distributed checkpoint data;
    reassembling the checkpoint data using the distributed checkpoint data; and
    using the checkpoint data to initiate execution of software.

16. The method of claim 15, further comprising:
    generating parity data for the at least one segment of checkpoint data; and
    supplying the parity data to the plurality of second servers.

17. The method of claim 15, further comprising: supplying the at least one segment of checkpoint data to the plurality of second servers in a striped manner.

18. A method for providing fault tolerant checkpoint data within a server cluster comprising a production server and a plurality of backup servers, the method comprising:
    accessing checkpoint data within the production server;
    distributing the checkpoint data, wherein distributing the checkpoint data comprises:
        creating a redundancy group of checkpoint data, wherein creating the redundancy group comprises:
            subsegmenting the checkpoint data; and
            forming groups of subsegments; and
        storing the redundancy group of checkpoint data upon the plurality of backup servers;
    creating parity data for each group of the groups of subsegments; and
    storing the distributed checkpoint data on the plurality of backup servers, wherein storing the distributed checkpoint data comprises: striping the subsegments and parity data across a plurality of backup servers.

19. The method of claim 18, wherein storing the distributed checkpoint data comprises: mirroring the checkpoint data onto the plurality of backup servers.

* * * * *

UNITED STATES PATENT AND TRADEMARK OFFICE
CERTIFICATE OF CORRECTION

PATENT NO. : 7,478,275 B1
APPLICATION NO. : 10/812139
DATED : January 13, 2009
INVENTOR(S) : Pavan Deolasee et al.

It is certified that error appears in the above-identified patent and that said Letters Patent is hereby corrected as shown below:

In column 5, line 14 delete "stored in memory 130," and insert
-- stored in memory $130_1$ --, therefor.

In column 5, line 16 delete "stored in memory 1302" and insert
-- stored in memory $130_2$ --, therefor.

In column 5, line 17 delete "stored in memory 1303" and insert
-- stored in memory $130_3$ --, therefor.

In column 5, line 19 delete "stored in memory 1304" and insert
-- stored in memory $130_4$ --, therefor.

Signed and Sealed this

Nineteenth Day of May, 2009

JOHN DOLL
*Acting Director of the United States Patent and Trademark Office*